US010339499B2

United States Patent
Rathbun et al.

(10) Patent No.: US 10,339,499 B2
(45) Date of Patent: Jul. 2, 2019

(54) COMPLIANCE AND GOVERNANCE POLICY PROPAGATION

(71) Applicant: HEWLETT PACKARD ENTERPRISE DEVELOPMENT LP, Houston, TX (US)

(72) Inventors: Robert Rathbun, Glen Burnie, MD (US); Jeff Kalibjian, Sunnyvale, CA (US); George Romas, Herndon, VA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 3 days.

(21) Appl. No.: 15/507,755

(22) PCT Filed: Apr. 29, 2015

(86) PCT No.: PCT/US2015/028250
§ 371 (c)(1),
(2) Date: Feb. 28, 2017

(87) PCT Pub. No.: WO2016/175791
PCT Pub. Date: Nov. 3, 2016

(65) Prior Publication Data
US 2017/0293887 A1    Oct. 12, 2017

(51) Int. Cl.
*G06F 17/27* (2006.01)
*G06Q 10/10* (2012.01)
*G06Q 50/26* (2012.01)

(52) U.S. Cl.
CPC ............. *G06Q 10/10* (2013.01); *G06Q 50/26* (2013.01); *G06F 17/2705* (2013.01)

(58) Field of Classification Search
CPC ..... G06Q 10/10; G06Q 50/26; G06F 17/2705
(Continued)

(56) References Cited

U.S. PATENT DOCUMENTS 7,587,404 B1 *  9/2009  Albertelli, Jr. ......... G06Q 50/34
7,743,414 B2 *  6/2010  Pouliot ................. G06F 21/577
                                                      709/224

(Continued)

OTHER PUBLICATIONS

Hwang et al., "ACPT: A Tool for Modeling and Verifying Access Control Policies," IEEE (Published Jul. 2010), NPL Reference 2.*

(Continued)

*Primary Examiner* — Lewis A Bullock, Jr.
*Assistant Examiner* — Theodore E Hebert
(74) *Attorney, Agent, or Firm* — Hewlett Packard Enterprise Patent Department

(57) ABSTRACT

To propagate compliance and governance (C&G) policies, a parser including natural language processing is used to deconstruct a set of organization C&G policies from a set of C&G documents to identify and record a parsed set of categorized C&G policies. A configuration parameter analyzer deconstructs and parses a plurality of C&G configuration parameters of an application program to identify and record a set of application C&G configuration parameters each comprising a purpose and a unit of measure. A reconciliation arranger receives the set of categorized C&G policies and the set of application C&G configuration parameters and maps the categorized C&G policies for the correct purpose and the unit of measure to the respective application C&G configuration parameters. The reconciliation arranger propagates and secures the application program with the respective set of mapped application C&G configuration parameters from mapped C&G policies.

17 Claims, 6 Drawing Sheets

(58) Field of Classification Search
USPC .......................................................... 717/120
See application file for complete search history.

(56) References Cited

U.S. PATENT DOCUMENTS

| | | | | |
|---|---|---|---|---|
| 8,245,191 | B2* | 8/2012 | Hirose | G06F 8/71 |
| | | | | 706/47 |
| 8,341,717 | B1* | 12/2012 | Delker | H04L 63/20 |
| | | | | 705/56 |
| 8,532,978 | B1* | 9/2013 | Turner | G06F 17/271 |
| | | | | 704/10 |
| 9,275,060 | B1* | 3/2016 | Supekar | G06F 17/30082 |
| 2006/0161879 | A1* | 7/2006 | Lubrecht | G06Q 10/06 |
| | | | | 717/101 |
| 2006/0184933 | A1* | 8/2006 | Chessell | G06F 8/20 |
| | | | | 717/177 |
| 2011/0078675 | A1* | 3/2011 | Van Camp | G06F 8/65 |
| | | | | 717/170 |
| 2014/0143753 | A1* | 5/2014 | Chappel | G06F 8/315 |
| | | | | 717/106 |
| 2017/0293887 | A1* | 10/2017 | Rathbun | G06Q 10/10 |

OTHER PUBLICATIONS

International Search Report and Written Opinion, International Application No. PCT/US2015/028250, dated Feb. 1, 2016, pp. 1-11, KIPO.

Jeehyun Hwang et al., "ACPT: A Tool for Modeling and Verifying Access Control Policies," Jul. 2010, pp. 1-4, IEEE.

Michael G. Stickland et al., "Natural Language Processing-Based COTS Software and Related Technologies Survey," Sandia Report, Sep. 2003, pp. 1-52, SAND2003-2916, Sandia National Laboratories.

Xusheng Mao et al., "Automated Extraction of Security Policies from Natural-Language Software Documents," SIGSOFT'12/FSE-20, Nov. 2012, pp. 1-11, ACM.

* cited by examiner

COMPLIANCE AND GOVERNANCE POLICY PROPAGATION

BACKGROUND

Companies, government bodies, and other organizations generally establish operational guidelines for deploying and managing both hardware and software elements of their Information Technology (IT) networks. Over time, these operational guidelines evolve and change in response to both internal and external factors, such as government laws and regulations, standards development, increased awareness of network vulnerabilities, computer and/or software vulnerabilities, new hardware and software, and new technology.

BRIEF DESCRIPTION OF THE DRAWINGS

The disclosure is better understood with reference to the following drawings. The elements of the drawings are not necessarily to scale relative to each other. Furthermore, like reference numerals designate corresponding similar parts through the several views.

DETAILED DESCRIPTION

IT governance policies develop out of industry and government compliance mandates such as laws, directives, and standards and internal organization needs. These policies are created in a variety of media and layout. Unsurprisingly, there is no consistent format or organization for communicating such policies.

Consequently, these compliance and governance (C&G) guidelines are neither monolithic nor static and are constantly changing due to new operational, governance, policy, and security requirements. However, as they evolve, they serve as a governance model to ensure the security, consistency, and availability of IT based services for the employees and service providers in an organization. Currently, there is no practical methodology or format for how to ensure that once changes are made to an organization's operational governance guidelines that these altered IT security policies will be propagated to new and existing applications/hardware for which their C&G configuration parameters should be properly set to reflect the governance guideline constraints.

Being able to properly set the C&G configuration parameters can ensure that the application/hardware is able to enforce the organizational operational governance policies required by organization standards, industry mandate, and/or law. Discussed within is a methodology and several procedures for an implementation of a system to provide an automated mechanism that can propagate an organization's security, compliance, and governance policies into the respective and appropriate configuration parameters that may be established in files, databases, or graphical user interfaces (GUI) of newly installed and existing software/appliance applications. The system may use natural language processing (NLP) of at least one compliance and governance policy based document to establish required application C&G configuration parameters. By having an automated mechanism, it is less likely that applications will be either accidentally misconfigured or purposely tampered with. Accordingly, unique methodologies and processes may be established by developing and deploying unique logic around the output of the natural language processing of compliance and governance policy statements as well as possibly any required application C&G configuration parameters and their mapping.

Figure 1:
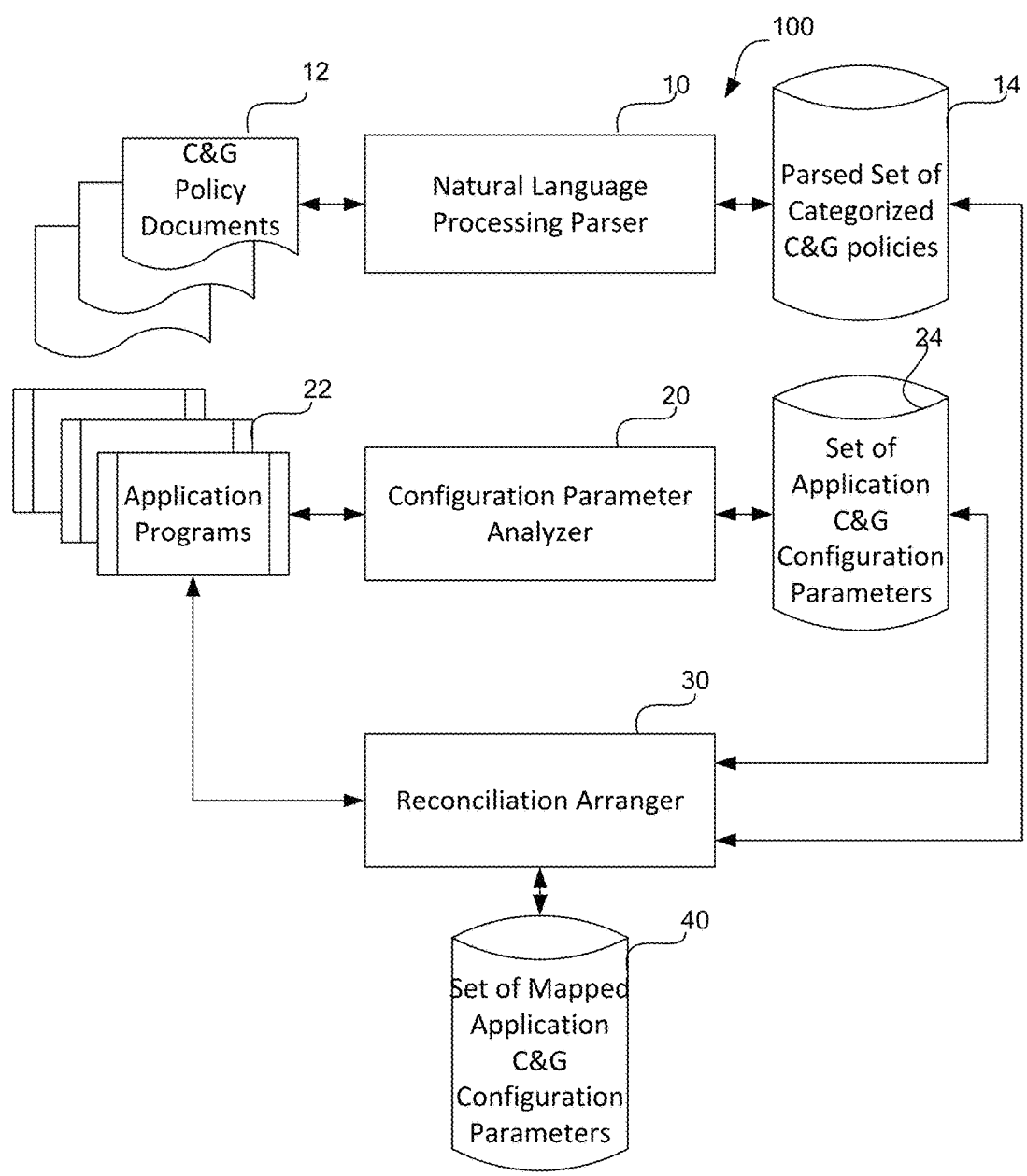
FIG. 1 is a block diagram of an example implementation of the automated propagation system of C&G policies.

FIG. 1 is an example block diagram of an automated system 100 to propagate IT policies to implement the unique methodology for automatic application configuration of IT security parameters. A set of one or more compliance and governance (C&G) policy documents 12, such as from a first repository, may be read by a natural language processing parser (NLPP) 10 to identify and record a parsed set of categorized compliance and governance policies 14, which can be stored in a second repository. Several different commercial and open source natural language processing tools exist for different operating systems and programming languages to implement NLPP 10.

For example, natural language processing (NLP) may be used to read, parse, and organize various structured and unstructured forms of organization, government, and third-party IT policies contained within C&G policy documents 12 to create a list or structured set of categorized required organization IT policies for each application to implement. An example NLPP 10 procedure is described in FIG. 6 using some functions from the Natural Language Toolkit (NLTK) for Python®.

Often times, policy experts within an IT organization will try to develop application security policy rules that reflect the industry best practices and particular IT policies of the organization. Nonetheless, when there are mandated rules that have been promulgated by government or organization governance bodies, these explicit rules typically have to be adhered to even if best practices would suggest otherwise. Accordingly, C&G rules should be classified into a hierarchy for their use such as by using NLPP 10 to facilitate parsing and sorting of the various governance statements to identify and record an extracted rule set, particularly from written unstructured prose form. This extracted rules set can then be applied in interpretation of the various application C&G configuration parameters.

Further, this unique methodology may reconcile and map the parsed set of categorized C&G policies 14 into purposes with discrete values and the respective values' unit of measure (UoM) for a set of application C&G configuration parameters 24 that are required to properly secure operation of applications being used within the organization, principally third party configured off the shelf (COTS) applications but also custom-designed and other applications as well. The set of application C&G configuration parameters 24 can be automatically updated by the system to reflect current organizational C&G standards as they change. In addition, the application configuration parameters can be digitally-signed to secure and prevent their alteration. Monitoring of the application C&G configuration parameters on employee and other organizational hardware can be done to ensure that a deployed application is not allowed to execute unless it's respective configuration and governance policy parameters have been verified as correct.

Further, each application program 22 may have its plurality of configuration parameters examined and analyzed to determine which ones are C&G configuration parameters with their purpose, value, and in which UoM the value. A unit of measure is a standard unit or system of units by which a quantity is accounted for and expressed. It may include for example the system of unit (metric, English), exponents (kilo, $10^4$, E06, etc.), time, date, temperature (C, F, K), weight (ounce), mass, pressure, energy, power, illumination, volume, length, area, velocity, magnetic and electrical field strengths, phase angles, and electrical current and voltage. There are various codes and standards for conversion available at "http://unitsofmeasure.org."

UoM also encompasses base conversion and formatting of network address and ports, such as hex, decimal, octal, and binary (see Table 5 for unit related examples). For instance, a required C&G policy may require an action occur every 90 days. However, an application C&G configuration parameter for the action may be required to be entered in terms of months. Another application configuration parameter may require the action configuration parameter to be entered in terms of years. In this example, the first application would have the action configuration parameter converted to "3" months, while for the second application it would be converted to "0.25" years or "4" times a year. In another example, a network type C&G configuration policy might require a network address configured as a decimal IP address, such as "192.168.7.1", while an application may require it entered in hex, such as "C0:A8:07:01" or into cells in a GUI interface. Accordingly, appropriate conversion of UoM and formatting may be performed as needed.

The configuration parameter analyzer (CPA) 20 may use NLP on unstructured documents such as application configuration manuals but could also use other techniques to parse application C&G configurations such as reading XML files or examining HTML GUI interfaces to identify and record a list or set of application C&G configuration parameters 24. A reconciliation arranger (RA) 30 may be used to match and map the identified set of application C&G configuration parameters 24 with an organization's parsed set of categorized C&G policies 14 and convert UoM as necessary. Because of possible word differences, the RA 30 may also use NLP, synonyms, glossaries, and thesauruses. Furthermore, if an application C&G configuration parameter 24 is found not mapped to an organization C&G policy requirement, then the unfound parameter may be flagged for review by organization staff to determine if the organization C&G policy should be updated. Additionally, any ongoing changes to the organization C&G policy documents 12 may be detected by the automated system 100 and the parsed set of categorized C&G policies 14 and the application C&G configuration parameters 24 may be updated as a result. An application program's configuration parameter files, databases, or memory within a deployed application may also be reviewed periodically to verify that C&G parameters have not been changed or tampered with, and if they have, prevent the application from executing. If those files are digitally-signed, then these checks can be automated by verifying digital signatures on the application configuration files. However, this file checking alone does not guard against in memory attacks for application configuration parameters. That is, if the application program 22 has read C&G configuration data from a digitally-signed configuration file into memory, and the memory locations storing the C&G configuration data are compromised, simply checking the digitally-signed data in the configuration file does not remedy this situation. Instead, the application program 22 may be configured to periodically or randomly re-read the digitally-signed configuration file and update memory to guard against in-memory attacks.

Accordingly, a set of one or more application programs 22 may be reviewed by the CPA 20 to catalog a set of application C&G configuration parameters 24 that each of the set of application programs 22 utilizes, which can be stored in a third repository. The RA 30 may read both the parsed set of categorized C&G policies 14 and the set of application C&G configuration parameters 24 to match or reconcile and record a set of mapped application C&G configuration parameters (MACP) 40, which can be stored in a fourth repository. The RA 30 can also update the set of application programs 22 with their respective MACP 40 to ensure they are propagated and configured properly before being executed.

The first repository may store the totality of an organization's governance and policy information in a schema. Most information will be written in some raw, freeform, or other unstructured prose form such as stated English composition (other languages are of course possible). Some could also be pre-parsed, structured, categorized, and recorded in a structured schema, such as an XML formatted flat file.

Figure 6:
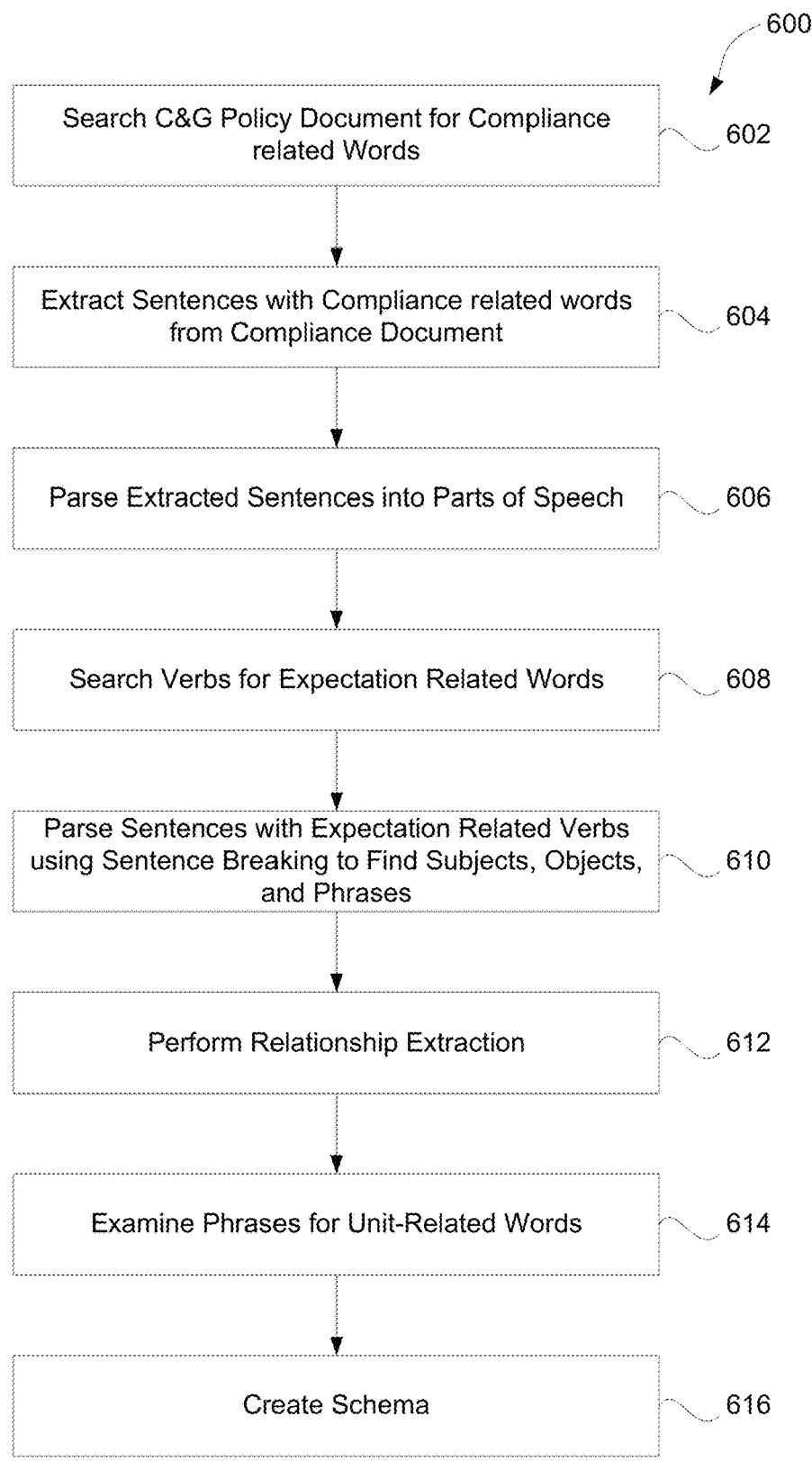
FIG. 6 is a block diagram of an example natural language processing procedure.

In a first phase of operation, the NLPP 10 may examine prosed English composition to determine if the information is utilizable and pertinent to the set of organization IT application programs 22 (see FIG. 6 for an example). For instance, an IT governance policy that indicates that a user password should be changed four times a year is extracted, normalized, and communicated as policy. However, a governance policy that states "company security personnel must undergo medical physical examination every year", may not be extracted because it is likely not IT application related. Generally, the first data repository holding the various C&G policy documents 12 may itself be loosely structured (such as just a file system) as the NLPP 10 may be used to triage and thus categorize the diverse written C&G statements into a schema stored in the second data repository, for instance by way of an XML based-schema, though there are many options known to those of skill in the art. The digital signature presented in Table 1 (and other Tables) ensures that the contents of the C&G schema file cannot be tampered or altered.

An example schema for the parsed set of categorized C&G policies 14 may contain the following fields as shown in Table 1.

TABLE 1

Example Schema for C&G Data File

| Field | Sub-field | Item value |
|---|---|---|
| Data Generation Information | Date | Date processed |
| | Time | Time processed |
| | Files processed | Filename1 |
| | | Filename2 |
| | | Filename3 |
| | | . . . |
| Compliance Category | IT | Compliance Statement 1 |
| | | Compliance Statement 2 |
| | | Compliance Statement 3 |
| | | . . . |

TABLE 1-continued

Example Schema for C&G Data File

| Field | Sub-field | Item value |
|---|---|---|
| | Finance | Compliance Statement 1 |
| | | Compliance Statement 2 |
| | | . . . |
| | Human Resources | Compliance Statement 1 |
| | | Compliance Statement 2 |
| | | . . . |
| Digital Signature | | Digital Signature |

There may be several different organization departments each with their own separate C&G requirements. For example, some compliance statements might be:
 IT Department
  Passwords will be changed by employees four times a year
  All application logs must be monitored
  Users of applications will have three attempts to input their password successfully
 Finance
  Financial Audits will be performed three times a year
 Human Resources (HR)
  Employees will be evaluated once a year
  Employees with 10 or more years seniority cannot be laid off without a technical committee review
As the various documents from each department in the organization are processed and the information extracted by natural language processor 10, such as purpose, value, and value UoM, they are added to the schema of parsed set of categorized C&G polices repository 14.

In a second phase of operation the application programs 22 are examined for their C&G related configuration items. The application configuration items may be provided in a separate configuration file for an application that may be processed using NLP. Alternatively, an application may have a GUI which can be probed by reading and processing its HTML code to provide a list of C&G configuration parameters for the application.

Some application programs 22 may provide tools to create, modify, and verify the syntax of their configuration items. Often times these tools may have a graphical user interface (GUI). For other application programs 22, system administrators may be expected to create and modify configuration files by hand using a text editor. For server processes and operating-system settings, there is often no standard tool, but operating systems may provide their own graphical interfaces such as YaST or debconf. Application programs 22 as used herein may also encompass operating systems, virtual machines, and application containers.

Some application programs 22 only read their configuration items at startup. Others periodically check the configuration items for changes. Users can instruct some programs to re-read the configuration items and apply the changes to the current process, or indeed to read arbitrary files to facilitate configuration. There are no definitive standards or strong conventions. This lack of standards exposes organizations to vulnerabilities from accidental and malicious tampering. Also, application programs 22 may use a different unit of measure for a configuration item than a particular unit of measure that may be stated in the organization's IT policies. For instance, time may be expressed as "per year" in the organization policy for a configuration item while an application program 22 may be required to be entered as "months."

Figure 2:
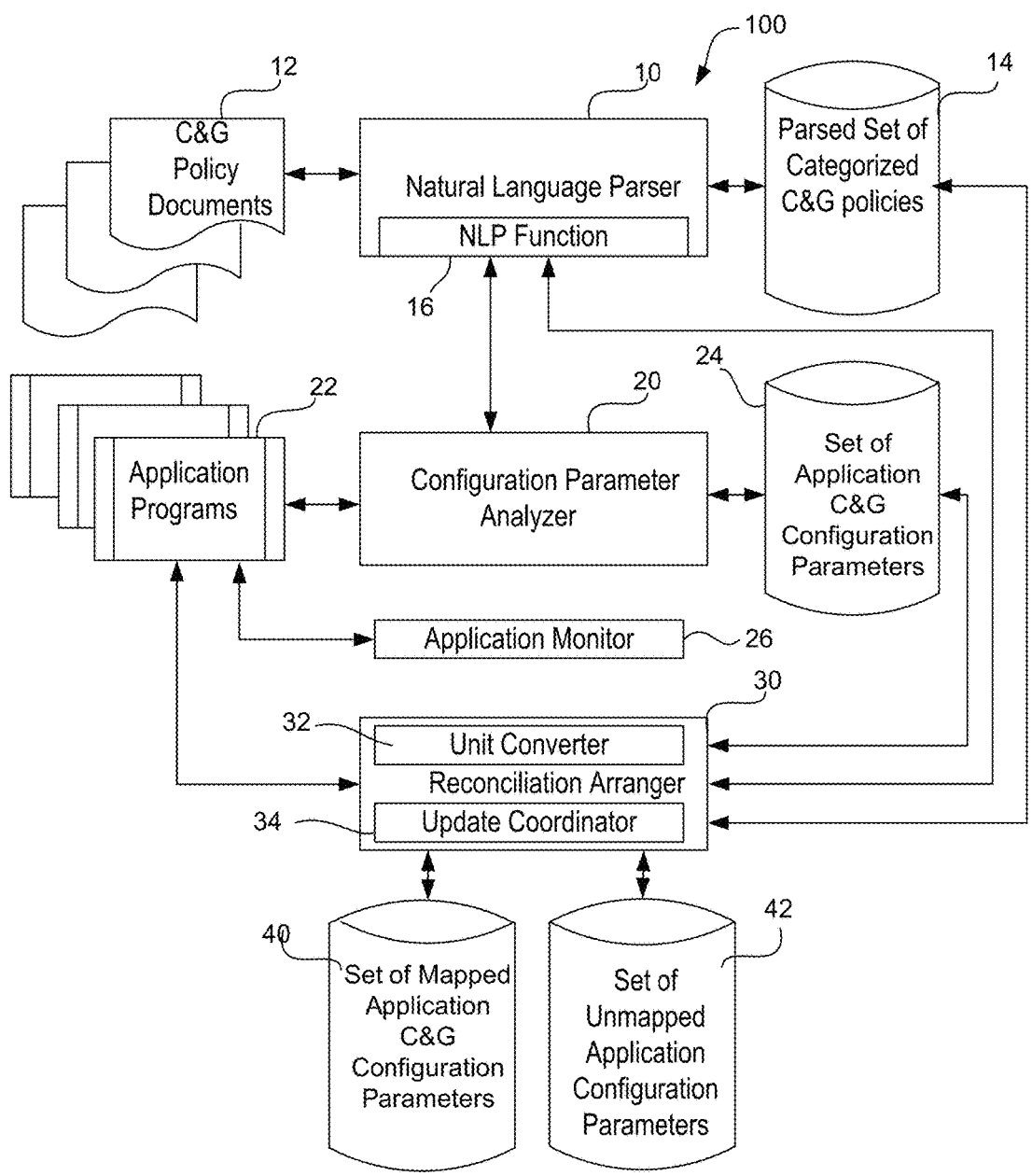
FIG. 2 is a block diagram of another example implementation of the automated propagation system of C&G policies.

In other examples, such as with FIG. 2, the configuration parameter analyzer 20 may interface with the natural language processor function 16 of the natural language parser 10 to allow application user or configuration manuals to be processed to identify and record a set of application C&G configuration parameters 24 and their purpose, default values, or valid value ranges for storage in a schema, such as XML, in the third repository. The NLP function 16 may be also capable of extracting the expected units of measure for the values required for the C&G configuration parameters for the application being processed. The NLP function 16 may be accessed by way of an API interface, SOAP, or REST interface, though there are several interfaces for providing software functions known to those of skill in the art.

An example schema for the parsed set of application C&G configuration parameters 24 may contain the following fields as shown in Table 2.

TABLE 2

Example Schema for Application C&G Configuration Parameters

| Field | Sub-field | Item Value |
|---|---|---|
| Data Generation Information | Date | Date processed |
| | Time | Time processed |
| | Files processed | Filename1 |
| | | Filename2 |
| | | Filename3 |
| | | . . . |
| Application Identification | | Application name |
| Application Configuration item | item name | Name of configuration item 1 |
| | Unit of measure | Unit for configuration item 1 |
| | Item name | Name of configuration item 2 |
| | Unit of measure | Unit for configuration item 2 |
| | | . . . |
| Digital Signature | | Digital Signature |

Some example C&G configuration items and their units are:
 Account password reset interval time—months
 max number of unsuccessful logon attempts—integer In a third phase of operation, the reconciliation arranger (RA) 30 examines the set of application C&G configuration parameters 24 for each application program and, for each respective application C&G configuration parameter, the RA 30 reviews the organization's parsed set of categorized C&G policies 14 to determine whether a particular application configuration item has previously been specified by the organization. If so, the RA 30 reconciles and binds the two items together to map and record the result in the set of Mapped Application C&G Configuration Parameters (MACP) 40 in the fourth repository.

For instance, if the RA 30 determines that an application necessitates that a user password reset timeframe is a required application C&G configuration parameter, then the RA 30 searches the parsed set of categorized C&G policies 14 to locate a directive, such as that the user password should be reset in organization-run applications X times a year. If such a directive is found then a configuration item match has been identified. The RA 30 can also reconcile unit of measure. That is, if the units of measure for a given C&G policy 14, which has been reconciled to a required application C&G configuration parameter 24, do not match (i.e. in the above example, password reset time specified in months in the C&G policy, versus password reset time expected in days by the application for that configuration item), then the RA 30 can convert the specific C&G policy item to the correct unit of measure for the application C&G configuration parameter. After this third phase, it is possible that some of the application configuration parameters are not found by RA 30 within the parsed set of categorized C&G policies 14 repository. This absence may imply that the organization's C&G directives were incomplete. Alternatively, the particular application may require a parameter very specific to the operation of the application itself and/or it may not be C&G related. In either event, a set of unmapped application configuration parameters 42 (FIG. 2) can be recorded in a fifth repository by RA 30. This set of unmapped application configuration parameters 42 can be reviewed by appropriate members of the organization to determine if their C&G policy documents 12 should be modified or updated. If so, then the natural language processing parser 10 may be re-executed to update the second repository with the parsed set of categorized C&G policies 14. Also, RA 30 should be executed again to ensure that the newly updated C&G policy is matched or reconciled to the appropriate set of application C&G configuration parameters 24 and recorded in the fourth repository containing the set of MACP 40. The reconciled C&G statements may also be converted into appropriate unit of measure where applicable for a particular application C&G configuration parameter and this can also be done using NLP function 16 (FIG. 2) to infer the appropriate unit conversion. Table 3 represents an example schema for a configuration item match file while Table 4 represents an example schema for the final application configuration file after unit conversion for storage in the set of MACP 40:

TABLE 3

Example Schema for Set of Mapped Application C&G Configuration Parameters

| Field | Sub-field | Item Value |
|---|---|---|
| Data Generation Information | Date | Date processed |
| | Time | Time processed |
| | Files processed | Filename1 |
| | | Filename2 |
| | | Filename3 |
| | | . . . |
| Application Identification | | Application name |
| Application Configuration item | Item name | Name of configuration item 1 |
| | Unit | Unit for configuration item 1 |
| | Compliance statement | Compliance Statement 1 |
| | Item name | Name of configuration item 2 |
| | Unit | Unit for configuration item 2 |
| | Compliance statement | Compliance Statement 2 |
| | | . . . |
| Digital Signature | | Digital Signature |

Some example configuration items and their units of measure along with the C&G compliance statement match for Table 3 are:

Account password reset interval time—months passwords will be changed by employees 4 times a year max number of unsuccessful logon attempts—integer users of applications will have three attempts to input their password successfully

TABLE 4

Example Schema for Set of Application C&G Configuration Parameters with values from C&G policies

| Field | Sub-field | Item Value |
|---|---|---|
| Data Generation Information | Date | Date processed |
| | Time | Time processed |
| | Files processed | Filename1 |
| | | Filename2 |
| | | Filename3 |
| | | . . . |
| Application Identification | | Application name |
| Application Configuration item | Item name | Name of configuration item 1 |
| | Unit | Unit for configuration item 1 |
| | Configuration value | <value 1> |
| | Item name | Name of configuration item 2 |
| | Unit | Unit for configuration item 2 |
| | Configuration value | <value 2> |
| | | . . . |
| Digital Signature | | Digital Signature |

Some example configuration items and their units of measure along with the C&G compliance statement value extraction for the match are:

Account password reset interval time—months

3 max number of unsuccessful logon attempts—integer

3

Enable token authentication—alpha-character

Y

To ensure file integrity, all of the different schemas shown in Table 1 to Table 4 may contain a digital signature to verify that the data contained in the particular schema files has not been changed or altered since it was originally generated. Furthermore, by having the time and date included of when the various schema files were processed, the recorded time and date can be compared to the time and date of the parsed set of categorized C&G policies 14 to determine whether the information contained within the schema is up-to-date and accurate. Finally, the schema files can also be encrypted if their data contents are deemed sensitive by organizational personnel.

After a particular application MACP schema file has been created, the application can be appropriately configured with any mapped identified configuration items. The RA 30 may also include a configuration gatekeeper or update coordinator routine 34 (FIG. 2) to help accomplish this activity. The RA 30 may read from the repository a set of MACP 40 and update or deposit that application specific C&G configuration parameter information into the application's configuration file or configuration database, or traverse the application GUI interface to specify the particular items. Of course, once the information is updated, the application may have to re-read the newly updated configuration file, configuration database, or memory to have the new configuration items take effect in the application. The update coordinator 34 may cause a re-start of the application program 22 to re-read the plurality of C&G configuration parameters that have been updated FIG. 2 is a more detailed system 100 similar version of FIG. 1 with additional capabilities, some of which have already been noted. For instance, the natural language parser 10 may include a natural language processor function 16 that can be accessed by the other modules. This access may be accomplished in the form of an application interface (API) via a web interface or via command line execution calls though an operating system (OS) interface with appropriate source file inputs and process output files specified and any options flagged as necessary. The RA 30 may include a unit converter function 32 used to provide the necessary unit conversion from the unit of measures utilized in the C&G policies into the appropriate units required by a particular application's C&G configuration parameters. The RA 30 may also include an update coordinator routine 34. This update coordinator routine is responsible for periodically checking the schema of parsed set of categorized C&G policies 14 to determine if any new records have been updated and if so, scanning and updating the schema in the set of MACP 40. The RA 30 may also keep a repository of a set of unmapped application configuration parameters 42 to allow the appropriate employees of the organization to review and determine if the C&G policies should be updated or whether the application configuration parameter is non-C&G related.

An application monitor routine 26 can be used to periodically check the status of each of the C&G configuration parameters in an application's configuration file, or configuration database, or memory on a regular, periodic, non-periodic, or random basis to confirm the values are identical to those contained in the schema of the set of MACP 40. Doing so will ensure that the parameters are not accidentally or maliciously altered, which might result in security vulnerabilities being introduced into the organization. Also, as organization C&G policies change, they are automatically propagated and reflected in the configurations of all deployed applications in the organization.

Another additional capability of application monitor 26 is a variant of application whitelisting. Application whitelisting embodies the notion of checking whether an application has the permission to execute in an organization's IT environment. For instance, if a user attempts to run an application, the application monitor 26 can check to see if the name of the application is in the set of application names contained within the schema of the set of MACP 40. If found, the application will be allowed to execute but if not found, it will not be allowed to execute. However, because of the various data within the MACP 40 even more capability can be added to the whitelisting function. This whitelisting is further enhanced by allowing a more complete assessment to be made as to whether that application has actually been configured in such a manner that it is in conformity and accord with organization stated C&G policies. The application monitor 26 can directly verify that all C&G configuration parameters for the application are up-to-date and accurate before allowing an application to execute. This additional capability further provides protection that an organization's IT infrastructure is less likely to be compromised by unapproved or even malicious misconfigured software or hardware.

Figure 3:
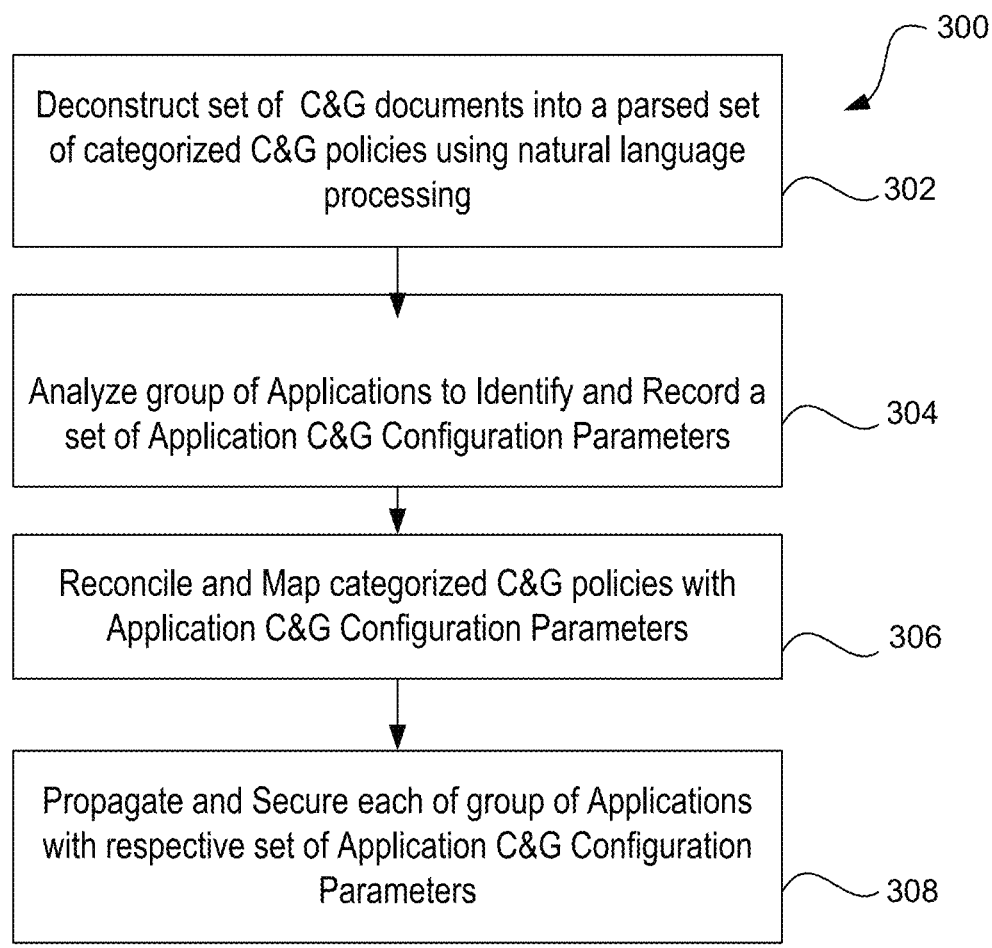
FIG. 3 is a flowchart of an example method for implementing the automated propagation system of C&G policies.

FIG. 3 is a flowchart of an example process 300 for implementing the claimed subject matter. In block 302, a set of organization C&G policy documents are deconstructed into a parsed set of categorized C&G policies using natural language processing from written raw, freeform or other unstructured prose form in English or other languages. The deconstructing may include steps of organizing, parsing, and categorizing the organizational C&G requirements. In block 304, a group of applications used in the organization are analyzed to identify and record a set of application C&G configuration parameters. This can be also done with natural language processing on an application's manuals but also can be done by examining and deconstructing an application's GUI configuration interface, parsing its configuration file, or examining the application's configuration database.

The categorized C&G policies of the organization are reconciled and mapped in block 306 with the application C&G configuration parameters. This may also include examining the parsed set of C&G policies 14 and the appropriate set of application C&G configuration parameters 24 to determine purpose, value and what unit of measure is being used for each policy or parameter. Unit transformation may be done to ensure the C&G configuration parameter is expressed with the value of the C&G policy but in the unit of measure the application configuration requires. In block 308, each of the set of application C&G configuration parameters 24 for each of the group of applications 22 are established to allow execution of the application and then secured, when possible, to prevent accidental misuse or malicious tampering. Also, periodically, non-periodically, or randomly, the parsed set of categorized C&G policies 14 can be re-examined to see if changes or updates need to be made to the set of mapped application C&G configuration parameters 40 to ensure that current organization C&G policies are propagated to deployed applications within the organization.

Figure 4A:
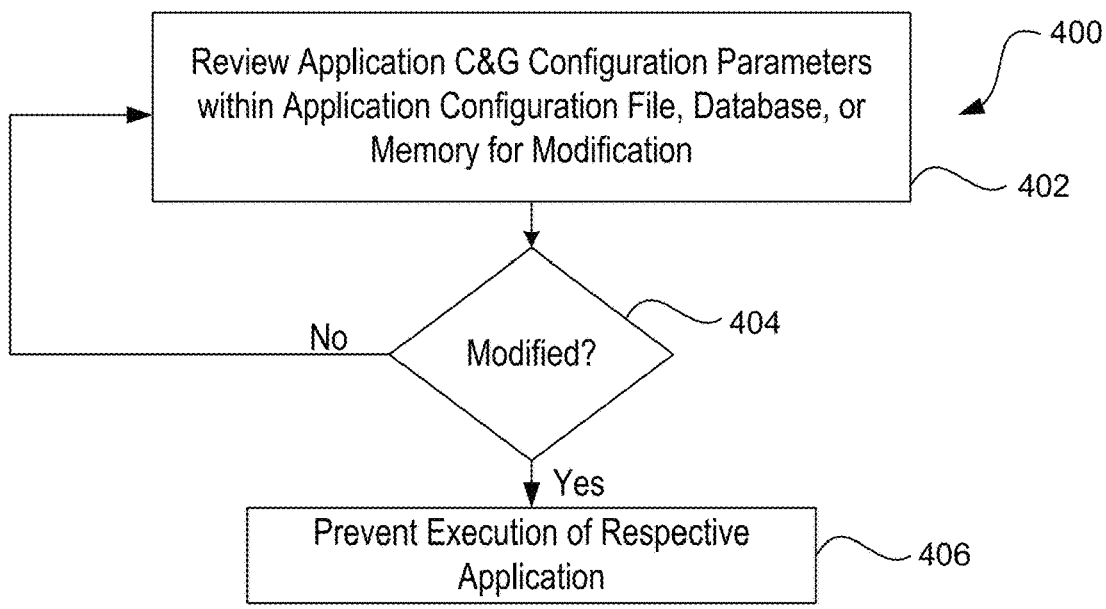
FIG. 4A is a flowchart of an example feature of the automated propagation system of C&G policies.

FIG. 4A is a flowchart of an example improved whitelisting process 400 of the checking done by the application monitor 26. In block 402, the application C&G configuration parameters within an application's configuration file or configuration database, or memory are reviewed to see whether they have been modified from that stored in the set of mapped application C&G configuration parameters 40. In decision block 404 a modification determination is made. If no modification is detected, then either periodic, non-periodic, or random checking by the application monitor 26 can continue. If an application configuration file, or configuration database, or memory has been modified, then in block 406, the respective application with the modification of the application C&G configuration parameters is prevented from executing. In some examples, when the application's C&G configuration parameters are detected as modified, the application C&G configuration parameters within the configuration file are updated to the current C&G policy values and the application is then allowed to execute. In this situation an organization may review and choose to implement this option as a consistent policy or approve of the update to the current C&G policy values on a case by case basis. This review is because a mismatch (which necessitates the update) may imply an intruder malfeasance in the organization, which may warrant an investigation.

Figure 4B:
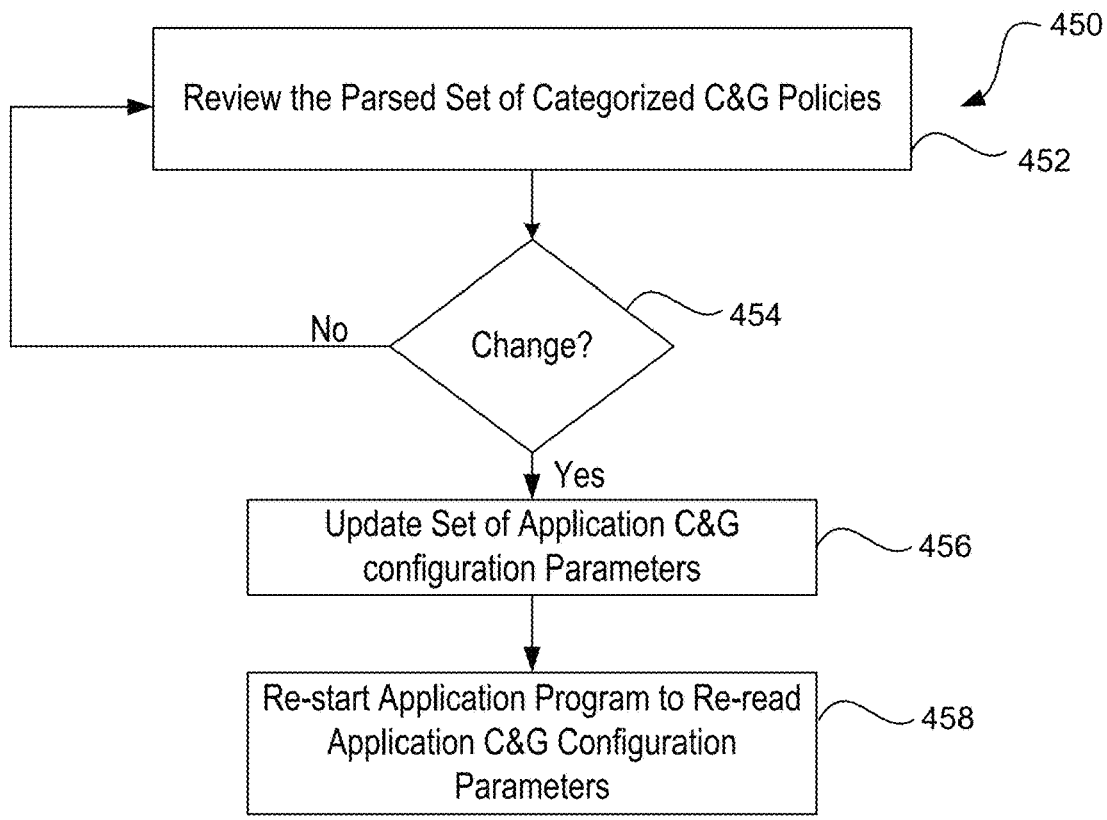
FIG. 4B is a flowchart of another example feature of the automated propagation system of C&G policies.

FIG. 4B is another flowchart 450 of an example feature which may be implemented. When NLP 10 detects a change in C&G policy documents 12 due to additions or modifications, it updates the parsed set of categorized C&G policies 14. RA 30 periodically reviews the parsed set of categorized C&G policies 14 in block 452. If in decision block 454 it is determined that the parsed set of C&G policies have changed, then in block 456 the set of application C&G configuration parameters 24 are updated. This action causes the update coordinator 34 in RA 30 to update the configuration parameters of the respective application programs 22 and cause a re-start of any application programs 22 that need to re-read their Application C&G configuration items from files, databases, or GUI interfaces.

Figure 5:
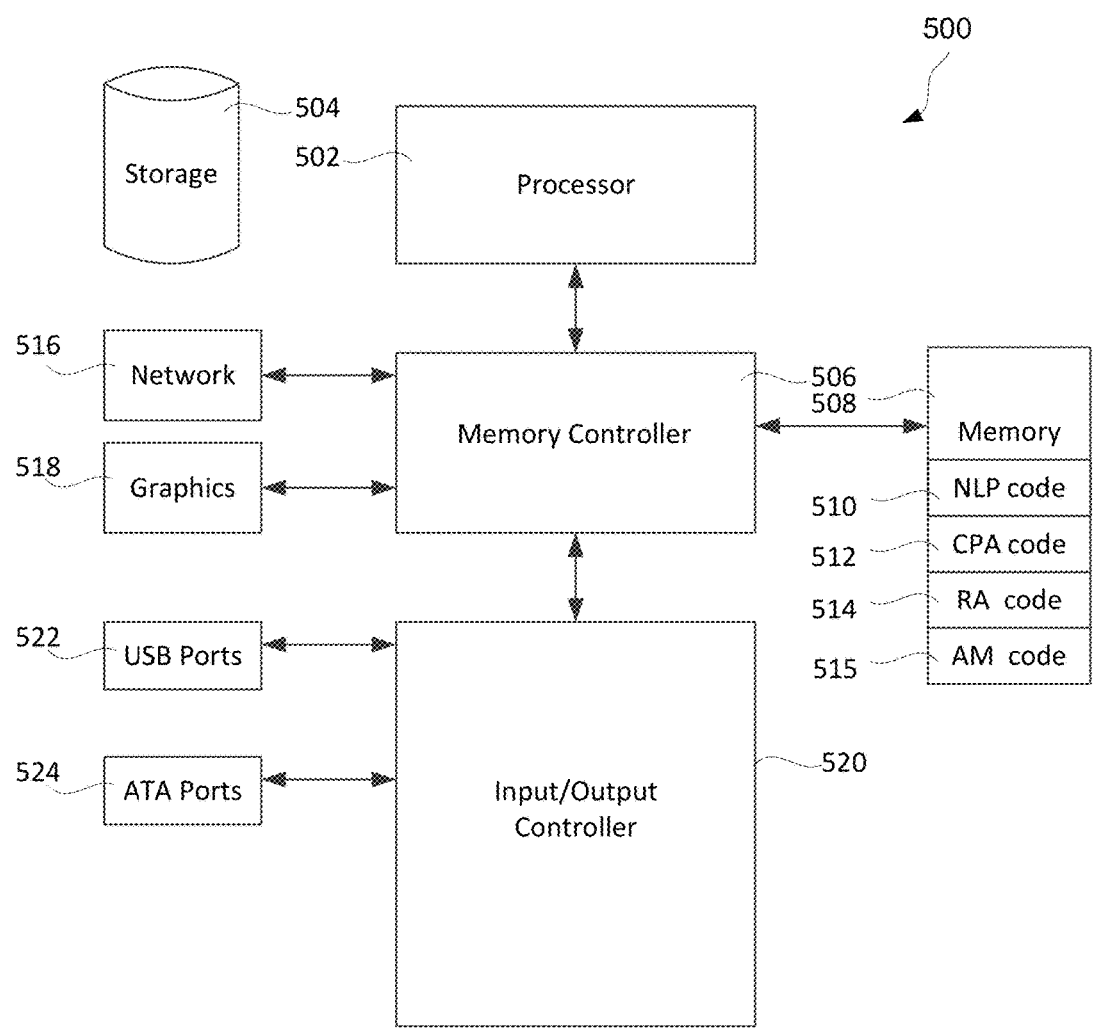
FIG. 5 is a block diagram of an example computer system and computer readable memory for implementing an automated propagation system of C&G policies.

FIG. 5 is an example computer system 500 for implementing an automated system to propagate IT policies 100 (FIG. 1). A processor 502 is connected to a memory controller 506 which is further connected to an Input/Output (I/O) controller 520. Memory controller 506 provides a high bandwidth and high speed interface to network 516, graphics 518, and non-transient computer readable memory 508 which includes instructions for performing tasks on processor 502, such as natural language processing (NLP) code 510, configuration parameter analyzer (CPA) code 512, reconciliation arranger (RA) code 514, and application monitor (AM) code 515.

I/O controller 520 provides several different input/output interfaces to allow processor 502 to retrieve or provide information. Several types of I/O interfaces are shown as non-limiting examples, such as Universal Serial Bus (USB) Ports 522 and Asynchronous Transfer Attachment (ATA) Ports 524. While memory controller 506 and I/O controller 520 are shown as two separate blocks, in some examples the blocks may be combined or alternatively broken into several different blocks. Storage 504 may be connected to computer system 500 in various possible fashions, such as with Network 516, ATA Ports 524, and USB ports 522. Storage 504 may include one or more copies of various repositories, such as the C&G policy documents 12, the parsed set of categorized C&G policies 14, the set of application C&G configuration parameters 24, the set of mapped application C&G configuration parameters 40, and the set of unmapped application configuration parameters 42.

The natural language processing (NLP) code 510, configuration parameter analyzer (CPA) code 512, reconciliation arranger (RA) code 514, and application monitor (AM) code 515 may also be described in the general context of non-transitory computer code or machine-useable instructions, including computer-executable instructions such as program modules or logic, being executed by a computer or other computing machine, such as a personal data assistant or other handheld device. Generally, program modules including routines, programs, objects, components, data structures, etc., refer to code that performs particular tasks or implements particular abstract data types. The natural language processing (NLP) code 510, configuration parameter analyzer (CPA) code 512, reconciliation arranger (RA) code 514, and application monitor (AM) code 515 may be practiced in a variety of system configurations, servers, clients, virtual machines, containers, cloud-based systems, general-purpose computers, more specialty computing devices, etc. They may also be practiced in distributed computing environments where tasks are performed by remote-processing devices that are linked through a communications network.

Computer-readable media (CRM) can be any available tangible and non-transitory media that can be accessed by computer system 500. Computer storage media 504 and memory 508 include both volatile and nonvolatile, removable and non-removable media implemented in any method or technology for storage of information such as computer-readable instructions, data structures, program modules, or other data. Communication media typically embody transitory computer-readable instructions, data structures, program modules, or other data in a modulated data signal such as a carrier wave or other transport mechanism and include any information delivery media. However, once received and stored, the communication media becomes non-transitory.

Network 516 allows computer system 500 to communicate with other computing devices including datacenter or cloud-based servers through one or more intranet, Internet, private, custom, or other networking protocols whether using wireless, wired, optical, or other electromagnetic techniques.

There are different types of IT configuration items that may be addressed in C&G policy documents:

Application configuration items—Used to determine compliance for an application. This can include whether the application is installed and details about its configuration; and Operating system configuration items—Used to determine compliance for settings that relate to the operating system and its configuration.

Each of these may have different wording or directives and the natural language processing may be targeted to each specifically or may be more broadly developed to address both together. Further, government or third-party compliance documents may use different terminology from organizational documents and the NLPP 10 may be developed to examine each separately and then apply a C&G related thesaurus or synonyms to equate the non-organizational document requirements with the organizational requirements. Table 5 is a non-limiting and non-comprehensive example list of words that can be used with NLPP 10 to identify which topics in a C&G policy document 12 or application program 22 should be examined by NLPP 10 or configuration parameter analyzer 20, respectively. In addition, plural or other forms of the words in the table may be used and in some examples, the words may be expanded by using an appropriate glossary, thesaurus, or synonym reference.

TABLE 5

Example Word Lists for Natural Language Processing

| Compliance Related | Expectation Related | Unit Related |
| --- | --- | --- |
| address | basis | address |
| admin | can | bay |
| administration | commitment | day |
| alias | could | hours |
| appliance | essential | hr. |
| application | may | min |
| attach | might | minute |
| audit | must | month |
| authentication | necessity | port |
| backup | need | second |
| boot | obligation | speed |
| boot order | ought | time |
| certificate | pre-requisite | times |
| client | require | type |
| conntemplate | requirement | unit |
| container | shall | value |
| database | should | year |
| delay | will | temperature |
| domain | will be | mass |
| enclosure | will have | weight |
| encryption | would | volume |
| ethernet | | area |
| fabric | | length |
| gateway | | bits |
| group | | bytes |
| host | | words |
| hostname | | pressure |
| internet | | energy |
| key | | power |
| license | | capacitance |
| Lig | | resistance |
| link | | conductance |
| logs | | inductance |
| mainframe | | electric field |
| module | | magnetic field |
| network | | phase angle |
| network sets | | luminance |
| network range | | intensity |
| password | | color |
| ping | | |
| pipe | | |
| port | | |
| root | | |

TABLE 5-continued

Example Word Lists for Natural Language Processing

| Compliance Related | Expectation Related | Unit Related |
|---|---|---|
| server | | |
| storage | | |
| subnet | | |
| token | | |
| uplink | | |
| user | | |
| username | | |
| virtual machine | | |

FIG. 6 is a block diagram of an example natural language processing procedure 600 used in the natural language processing parser 10 to derive a parsed set of categorized C&G policies 14 from a set of C&G policy documents 12. In block 602, a search is made of one or more of the C&G policy documents 12 looking for compliance related words such as those in example Table 5. For instance, assume that the following sentence was found in a C&G document 12:

"Passwords will be changed by employees four times a year."

If a compliance purpose related word is found, such as "password", then in block 604 the sentence with the compliance related word is extracted from the respective C&G document 12. In block 606, the extracted sentence may be parsed using natural language processing, such as with the NLTK for Python®, into "parts of speech." This "parts of speech" extraction determines the part of speech for each word. For example in the extracted sentence example, "passwords" is a noun, "will be changed" a verb phrase, "will be" being intentional or model verbs, "changed" being an active verb. "by employees four times a year" is a phrase, with "by" being a preposition, "employees" being a noun, "four" an adjective, "times" being a noun, "a" an indefinite article, and "year" being a noun.

In block 608, the verbs found are searched to determine if there are any expectation related words, such as those examples in Table 5. These expectation related words are ones that are likely to signal that the C&G document is making a necessity or requirement purpose to be followed. If the verbs have an expectation related word, such as "will" in the example extracted sentence, then in block 610, the sentence is parsed with NLPP 10 using "sentence breaking" to find subjects, objects and phrases. "Passwords" is the subject, "by employees four times a year" is a phrase and object of the sentence. In block 612, the NLPP 10 then uses "Relationship Extraction" to determine the particular relationships where purpose and units of measure are identified. That is, given a piece of sentence text, identify the relationships among named entities. For the example extracted sentence, "employees" is the target, "passwords" is the desired outcome purpose or item name, "changed" is the action, "four times a year" is the period unit of measure.

In block 614, the phrases are examined to search for unit-related words, such as those examples listed in Table 5. For the extracted sentence, the phrase "by employees four times a year" the unit-related words are "times a year" and the adjective "¼" is the amount or configuration value since "year" is determined as the unit and "times a" is interpreted as "per" or fraction of year. In block 616, a schema of the sentence can be created and recorded, such as with XML or other schemas known to those of skill in the art. For example, an XML C&G policy schema for the example extracted sentence item assuming it was part of an IT C&G document could be:

```
<C&G Policy>
    <application>application_name</application>
    <compliance category>IT
        <compliance statement> Passwords will be changed by
        employees four times a year</compliance statement>
            <target> employees </target>
            <action> change </action>
            <item name> password </item name>
            <unit> year </unit>
            <configuration value> 1/4 </configuration value>
    </compliance category>
</C&G Policy>
```

While the present disclosure has been particularly shown and described with reference to the foregoing examples, those skilled in the art will understand that many variations may be made therein without departing from the scope of the claimed subject matter. This description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A system, comprising:
   a processor, and
   a non-transitory storage medium storing instructions executable on the processor to:
      using natural language processing, deconstruct and parse a set of compliance and governance (C&G) documents to identify C&G policies in the C&G documents for an application program, and record the identified C&G policies;
      using natural language processing, deconstruct and parse sources of application C&G configuration parameters for the application program to identify and record a set of application C&G configuration parameters each comprising a purpose, a value, and a unit of measure;
      map the identified C&G policies to respective application C&G configuration parameters in the set of application C&G configuration parameters, the mapping comprising converting a unit of measure of an application C&G configuration parameter in the set of application C&G configuration parameters based on a respective C&G policy;
      configure and deploy the application program with the converted application C&G configuration parameters mapped to the identified C&G policies;
      monitor the identified C&G policies and the sources of application C&G configuration parameters used to configure the application program to verify there has been no change to the identified C&G policies and that the application C&G configuration parameters have not been changed from a time when the application C&G configuration parameters were propagated to the application program after the mapping; and
      in response to determining that there has been a change to the identified C&G policies or the application C&G configuration parameters, cause a re-start of the application program to re-read the application C&G configuration parameters that have been updated.

2. The system of claim 1 wherein the instructions are executable on the processor to use natural language processing on the sources of application C&G configuration parameters for the application program including on at least one of an application configuration file, an application configuration database, or an application graphical user interface to identify the set of application C&G configuration parameters.

3. The system of claim 1 wherein the instructions are executable on the processor to use natural language processing to perform the mapping of the identified C&G policies to the respective application C&G configuration parameters.

4. The system of claim 1 wherein the identified C&G policies are recorded in a first data repository, the set of application C&G configuration parameters is recorded in a second data repository for all application programs approved by an organization, and a third repository is used to record the respective mapped application C&G configuration parameters.

5. The system of claim 1, wherein the instructions are executable on the processor to:
prevent execution of the application program in response to detecting modification of the application C&G configuration parameters used to configure the application program.

6. The system of claim 1, wherein the mapping causes creation of a file of the application C&G configuration parameters mapped to the C&G policies, and the verifying is based on comparing values of the application C&G configuration parameters used to configure the application program to values of the application C&G configuration parameters mapped to the C&G policies in the file.

7. The system of claim 6, wherein the instructions are executable on the processor to:
in response to a request to execute the application program:
check whether the file contains information for the application program; and
block execution of the application program in response to determining that the file does not contain information for the application program.

8. The system of claim 1, wherein the instructions are executable on the processor to:
identify a given application C&G configuration parameter of the application program that is not matched by the mapping to any C&G policy; and
in response to the identifying of the given application C&G configuration parameter, cause an update of a C&G policy document to cause update of C&G policies.

9. A method executed by a system comprising a hardware processor, comprising:
parsing one or more compliance and governance (C&G) policy documents using natural language processing to identify and record a set of C&G policies for an application program into a first schema;
analyzing the application program to determine, parse, and record a set of application C&G configuration parameters each comprising a purpose, a value, and a unit of measure into a second schema;
reconciling the first schema and the second schema to map the C&G policies with respective application C&G configuration parameters in the set of application C&G configuration parameters, the mapping comprising converting a unit of measure of an application C&G configuration parameter in the set of application C&G configuration parameters based on a respective C&G policy, and recording the mapped application C&G configuration parameters in a third schema;
configuring and deploying the application program with the mapped and converted application C&G configuration parameters;
monitoring the set of C&G policies and the application C&G configuration parameters used to configure the application program to verify there has been no change to the set of C&G policies and that the application C&G configuration parameters have not been modified from a time when the application C&G configuration parameters were propagated to the application program after the reconciling; and
in response to determining that there has been a change to the set of C&G policies or the application C&G configuration parameters, causing a re-start of the application program to re-read the application C&G configuration parameters that have been updated.

10. The method of claim 9, further comprising:
preventing execution of the application program in response to detecting modification of the application C&G configuration parameters used to configure the application program.

11. The method of claim 9, wherein the mapping causes creation of a file of the application C&G configuration parameters mapped to the C&G policies, and the verifying is based on comparing values of the application C&G configuration parameters used to configure the application program to values of the application C&G configuration parameters mapped to the C&G policies in the file.

12. The method of claim 11, further comprising:
in response to a request to execute the application program:
checking whether the file contains information for the application program; and
blocking execution of the application program in response to determining that the file does not contain information for the application program.

13. A non-transitory computer readable storage medium comprising instructions that cause a system to:
parse compliance and governance (C&G) policy documents into a first schema of a set of C&G policies for a deployed application program using natural language processing;
analyze the deployed application program to identify, parse, and record application C&G configuration parameters for the deployed application program in a second schema, wherein the first and the second schemas each includes a purpose, a value and a unit of measure for each respective C&G policy and application C&G configuration parameter; map the set of C&G policies to the application C&G configuration parameters, the mapping comprising converting a unit of measure of an application C&G configuration parameter of the recorded application C&G configuration parameters based on a respective C&G policy, and record a third schema of the mapped application C&G configuration parameters;
configure the deployed application program with the mapped and converted application C&G configuration parameters according to the third schema;
monitor the set of C&G policies and mapped application C&G configuration parameters used to configure the deployed application program to verify there has been no change to the set of C&G policies and that the mapped application C&G configuration parameters have not been modified from a time when the mapped application C&G configuration parameters were propagated to the deployed application program after the mapping; and in response to determining that there has been a change to the set of C&G policies or the application C&G configuration parameters, cause a re-start of the application program to re-read the application C&G configuration parameters that have been updated.

14. The non-transitory computer readable storage medium of claim 13, wherein the instructions when executed cause the system to monitor at least one of an application configuration parameter file, an configuration database for the deployed application program, or an application configuration GUI to detect modification of an application C&G configuration parameter and if the modification is detected, prevent execution of the deployed application program.

15. The non-transitory computer readable storage medium of claim 14, wherein the instructions when executed cause the system to update at least one of the application configuration parameter file, the configuration database for the deployed application program, or the application configuration GUI with any modification of a mapped application C&G configuration parameter as a result of modification of a C&G policy document in the C&G policy documents.

16. The non-transitory computer readable storage medium of claim 13, wherein the instructions when executed cause the system to:

prevent execution of the deployed application program in response to detecting modification of the mapped application C&G configuration parameters used to configure the deployed application program.

17. The non-transitory computer readable storage medium of claim 13, wherein the instructions when executed cause the system to:

identify a given application C&G configuration parameter of the application program that is not matched by the mapping to any C&G policy; and in response to the identifying of the given application C&G configuration parameter, cause an update of a C&G policy document to cause update of C&G policies.

* * * * *